United States Patent
Ruf

[11] Patent Number: 6,077,313
[45] Date of Patent: Jun. 20, 2000

[54] TYPE PARTITIONED DATAFLOW ANALYSES

[75] Inventor: Erik Ruf, Kirkland, Wash.

[73] Assignee: Microsoft Corporation, Redmond, Wash.

[21] Appl. No.: 08/957,997

[22] Filed: Oct. 22, 1997

[51] Int. Cl.[7] .................................................. G06F 9/45
[52] U.S. Cl. ............................ 717/8; 395/709; 395/710
[58] Field of Search ................................... 395/701, 702, 395/709, 708, 710; 364/133, 783, 230

[56] References Cited

U.S. PATENT DOCUMENTS

| | | | |
|---|---|---|---|
| 5,127,104 | 6/1992 | Dennis | 395/685 |
| 5,146,594 | 9/1992 | Iitsuka | 395/708 |
| 5,396,627 | 3/1995 | Iitsuka | 395/709 |
| 5,465,372 | 11/1995 | Gottlieb et al. | 712/25 |
| 5,485,616 | 1/1996 | Burke et al. | 395/709 |
| 5,790,866 | 8/1998 | Robison | 395/709 |
| 5,896,537 | 4/1999 | Landi et al. | 795/704 |

OTHER PUBLICATIONS

Johnson et al, "Dependence based program analysis", ACM SIGPLAN PLDI, pp. 78–89 Apr. 1993.
Diwan et al, Type based alias analysis, ACM SIGPLAN, pp. 106–117 Apr. 1998.
Grunwald et al, "Data flow equation for explictly parallel programs", ACM PPOPP pp. 159–168 May 1993.
Ramalingam, "Data flow frequency analysis", PLDI ACM, pp. 267–277 Feb. 1996.
Defouw et al, "Fast interprocedural class analysis", POPL ACM, pp. 222–236 Mar. 1998.
Reps et al., "Precise interprocedural dataflow analysis via graph reachability", POPL ACM, pp. 49–61 1995.
Lee and Ryder, "A comprehensive approach to parallel dataflow analysis", ICS ACM, pp. 236–247 1992.
Debray, "Effficient dataflow analysis of logic programs", J. of ACM, vol. 39, No. 4, Oct. 92, pp. 949–984, 1992.
Collard et al., "Fuzzy array dataflow analysis", PPOPP 95 ACM, pp. 92–101, 1995.
Horwitz et al., "Demand interprocedural dataflow analysis", SIGSOFT 95, ACM, pp. 104–115, 1995.
Maslov, "Enhancing array dataflow dependence analysis with on demand global value propagation", ICS 95 ACM, pp. 265–269, 1995.
Debray, "On the complexity of dataflow analysis of logic programs", ACM Tran. Prog. Lang. & Syst. vol. 17, No. 2, Mar. 1995, pp. 331–365.
Miller et al., "A quanitative analysis of locality in dataflow diagram", ACM, 1991 pp. 12–18.
Najjar et al., "Analysis of loop latency in dataflow execution", ACM 1992, pp. 352–360.

(List continued on next page.)

Primary Examiner—Paul R. Lintz
Assistant Examiner—Anil Khatri
Attorney, Agent, or Firm—Watts, Hoffman, Fisher & Heinke Co.

[57] ABSTRACT

Type partitioned dataflow analyses perform a dataflow analysis of a program by partitioning the dataflow analysis into phases using types to help reduce costs attendant to the dataflow analysis of the entire program. Each phase models only a subset of the relevant program quantities and may be analyzed separately. Type partitioned dataflow analyses extend quantity-based partitioning to non-separable dataflow analyses by determining analysis-time dependencies connoting potential run-time interactions between relevant program quantities and scheduling the dataflow analysis of each program quantity after the dataflow analysis of all other program quantities upon which it depends. Because each phase may be analyzed separately, type partitioned dataflow analyses may enable the use of suitable efficient dataflow techniques, such as suitable sparse representation methods for example, that otherwise could not have been used for an entire non-separable program and may also enable the performance of dataflow analyses in parallel for more than one separate phase of such a non-separable program.

46 Claims, 4 Drawing Sheets

OTHER PUBLICATIONS

Ruf, "Partitioning dataflow analyses using types", POPL 97 ACM, pp. 15–26, 1997.

Jensen, "Clock analysis of synchronous dataflow programs", PEPM 95 ACM, pp. 156–167, 1995.

Chase, David R, et al., "Analysis of Pointers and Structures," Proceedings of the ACM SIGPLAN'90 Conference on Programming Language Design and Implementation, White Plains, New York, pp. 296–310 (Jun. 20–22, 1990).

Choi, Jong–Deok, et al., "Automatic Construction of Sparse Data Flow Evaluation Graphs," Proceedings of the Eighteenth Annual ACM Symposium on Principles of Programming Languages, pp. 55–66 (Aug. 1990).

Cousot, Patrick, et al., "Abstract Interpretation: A Unified Lattice Model for Static Analysis of Programs by Construction or Approximation of Fixpoints," Proceedings of the Fourth Annual ACM Symposium on Principles of Programming Languages, pp. 238–252 (Jan. 1977).

Cytron, Ron, et al., "Efficiently Computing Static Single Assignment From and the Control Dependence Graph," *ACM Transactions on Programming Language and System*, vol. 13, No. 4, pp. 451–490 (Oct. 1991).

Deutsch, Alain, "Interprocedural May–Alias Analysis for Pointer: Beyond k–limiting," SIGPLAN'94 Conference on Programming Language Design and Implementation, Orlando, Florida, pp. 230–241 (Jun. 1994).

Dhamdhere, Dhananjay M., et al., "How to Analyze Large Programs Efficiently and Informatively," Proceedings of the SIGPLAN'92 Conference on Programming Language Design and Implementation, pp. 212–223 (Jun. 1992).

Duesterwald, Evelyn, et al., "Reducing the Cost of Data Flow Analysis By Congruence Partitioning ," CC'94: Fifth International Conference on Complier Construction, pp. 357–373 (Apr. 1994).

Hendren, Laurie J., et al., "Abstractions for Recursive Pointer Data Structure: Improving the Analysis and Transformation of Imperative Programs," Proceedings of the SIGPLAN'92 Conference on Programming Language Design and Implementation, pp. 249–260 (Jun. 1992).

Henglein, Fritz, "Efficient Type Inference for Higher–Order Binding–Time Analysis," *Functional Programming Language and Computer Architecture*, 5th ACM Conference, Cambridge, Massachusetts, pp. 448–472 (Aug. 26–30, 1991).

Henglein, Fritz, "Global Tagging Optimization by Type Inference," Proceedings of the Conference on LISP and Functional Programming, pp. 205–215 (Jun. 1992).

Johnson, Richard, et al., "The Program Structure Tree: Computing Control Regions in Linear Time," Proceedings of the SIGPLAN'94 Conference on Programming Language Design and Implementation, Orlando, Florida, pp. 171–185 (Jun. 20–24, 1994).

Jourdan, Martin, et al., "Techniques for Improving Grammar Flow Analysis," Lecture Notes in Computer Science, No. 432, 3rd European Symposium on Programming, Copenhagen, Denmark, pp. 240–255 (May 15–18, 1990).

Landi, William, et al., "Pointer–induced Aliasing: A Problem Classification," Proceedings of the Eighteenth Annual ACM Symposium on Principles of Programming Languages, pp. 93–103 (Aug. 1990).

Landi, William, et al., "A Safe Approximate Algorithm for Interprocedural Pointer Aliasing," Proceedings of the SIGPLAN'92 Conference on Programming Language Design and Implementation, pp. 235–248 (Jun. 1992).

Lee, Yong–fong et al., "Region Analysis: A Parallel Elimination Method for Data Flow Analysis," International Conference on Computer Language, IEEE Computer Society, pp. 31–42 (May 1994).

O'Callahan, Robert, et al., "Detecting Shared Representations Using Type Inference," Technical Report CMU–CS–95–202, School of Computer Science, Carnegie Mellon University, Pittsburgh, Pennsylvania, pp. 1–21 (Sep. 1995).

O'Callahan, Robert, et al. "Practical Program Understanding With Type Inference," Technical Report CMU–CS–96–130, School of Computer Science, Carnegie Mellon University, Pittsburgh, Pennsylvania, pp. 1–18 (May 1996).

Reps. Thomas, et al., "Precise Interprocedural Dataflow Analysis via Graph Reachability," Proceedings of the 22nd ACM SIGPLAN–SIGACT Symposium on Principles of Programming Languages, pp. 49–61 (Jan. 1995).

Ruf, Erik, "Context–Insensitive Alias Analysis Reconsidered," SIGPLAN'95 Conference on Programming Language Design and Implementation, La Jolla, California, pp. 13–22 (Jun. 1995).

Ruf, Erik, "Optimizing Sparse Representations for Dataflow Analysis," *ACM SIGPLAN Workshop on Intermediate Representations*(IR'95), San Francisco, California, pp. 50–61 (Jan. 1995).

Steensgaard, Bjarne, "Sparse Functional Stores for Imperative Programs," ACM SIGPLAN Workshop on Intermediate Represntations (IR'95), San Francisco, California, pp. 62–70 (Jan. 22, 1995).

Steensgaard, Bjarne, "Points–to Analysis in Almost Linear Time," Proceedings of the 23rd SIGPLAN/SIGACT Symposium on Principles of Programming Languages, St. Petersburg, Florida, pp. 32–41 (Jan. 21–24, 1996).

Steensgaard, Bjarne, "Points–to Analysis by Type Inference of Programs with Structures and Unions," Lecture Notes on Computer Science, vol. 1060, Proceedings of the 1996 International Conference on Compiler Construction, Linköbing, Sweden, pp. 136–150 (Apr. 24–26, 1966).

Weise, Daniel, et al., "Value Dependence Graphs: Representation Without Taxation," Technical Report MSR–TR–94–03, Microsoft Research, Redmond, Washington, 14 pages (Apr. 13, 1994).

Wilson, Robert P., et al., "Efficient Context–Sensitive Pointer Analysis for C Programs," SIGPLAN'95 Conference on Programming Language Design and Implementation, La Jolla, California, pp. 1–12 (Jun. 1995).

Zhang, Sean, et al., "Program Decomposition for Pointer––induced Aliasing Analysis," Technical Report LCS-R–TR–259, Laboratory of Computer Sciences Research, Rutgers University, New Brunswick, New Jersey, pp. 1–37 (Mar. 1996).

Zhang, Sean, et al., "Program Decomposition for Pointer Aliasing: A Step Toward Practical Analyses," Fourth Symposium on the Foundations of Software Engineering(*FSE*4), San Francisco, California, 12 pages (Oct. 16–18, 1996).

TYPE PARTITIONED DATAFLOW ANALYSES

FIELD OF THE INVENTION

The present invention relates generally to the field of computer program analyses. More particularly, the present invention relates to the field of dataflow analyses for computer programs.

BACKGROUND OF THE INVENTION

Various computer program analysis tools such as compilers, style checkers, static bug detectors, and restructuring tools for example, typically perform static program analyses to better optimize, understand, or browse computer programs. Such analysis tools perform program-point-specific dataflow analyses, for example, to approximate the expected run-time behavior of a program. A typical compiler, for example, may use dataflow analyses to help optimize the run-time execution of compiled programs. Examples of dataflow analyses include interprocedural constant propagation and points-to analysis.

Dataflow analyses generate a model of every program quantity of interest, such as each variable, expression, or storage location for example, at every program point, such as each expression, control flow graph node, or program counter value for example. Typical dataflow analyses are monolithic and simultaneously model all relevant program quantities at all relevant program points. The attendant costs of memory space and execution time for such analyses are proportional to the following factors:

(1) the cost of modeling a single quantity at a single point,
(2) the number of quantities modeled, and
(3) the number of points at which each quantity is modeled.

As factor (1) increases for more sophisticated analyses and as factors (2) and (3) increase for analyses on large or entire programs, dataflow analysis costs can grow relatively large.

Sparse representation methods help reduce the costs of performing dataflow analyses by reducing factor (3). Such methods model each program quantity of interest at only those program points where the value of the quantity's model might differ from the value at the points' predecessor. Because most program points affect only a small subset of the program quantities, oftentimes only one program quantity, cost reductions may be significant.

Other methods to reduce the costs of performing dataflow analyses target factor (2) or both factors (2) and (3) by partitioning the analysis into phases, each of which models only a subset of the program quantities and/or points.

Partitioning the dataflow analysis into phases helps reduce memory space costs as some dataflow analyses or optimizations may be performed on a per-phase basis. The storage used by the analysis for each phase may therefore be reclaimed for use by subsequent phases. As one example, an assignment to a dead variable can be removed irrespective of the liveness of any other variable or any other assignment statement. Similarly, primitive operations having operands that are constants can be folded without knowledge of the constancy of other program quantities. The working memory requirements for the dataflow analysis are therefore reduced to those of the most expensive phase.

Because of, for example, the need to model quantities at meet points, auxiliary data structures such as dependence graphs used by the analysis, and incomplete usage of the solution of the dataflow analysis, each phase's solution typically requires less storage than computing it. Partitioning therefore also allows excess intermediate storage to be reclaimed following the performance of each phase.

Partitioning the dataflow analysis may also reduce the execution time costs if individual phases may be performed by more efficient dataflow analyses and/or if more than one individual phase may be performed simultaneously in parallel.

Point-based partitioning schemes use control flow relationships between program points to model only a subset of the points in each phase. Examples of point-based schemes include interval-based dataflow analyses and interprocedural analyses that separate intraprocedural analysis from interprocedural propagation.

Quantity-based partitioning schemes analyze all program points yet model only a subset of the program quantities for each phase. Existing quantity-based schemes, however, are restricted to separable dataflow analyses, such as reaching definition analyses and live variable analyses for example, where the dataflow solution for each program quantity is independent of those for all other quantities. Some dataflow analyses, such as constant propagation and points-to analysis for example, are not separable because some of the program quantities may interact during the analysis. Such non-separable dataflow analyses may not be partitioned using existing quantity-based partitioning schemes and therefore model all relevant program quantities simultaneously to account for the possible interaction of program quantities.

SUMMARY OF THE INVENTION

Type partitioned dataflow analyses perform a dataflow analysis of a program by partitioning the dataflow analysis into phases using types to help reduce costs attendant to the dataflow analysis of the entire program. Each phase models only a subset of the relevant program quantities and may be analyzed separately. Type partitioned dataflow analyses extend quantity-based partitioning to non-separable dataflow analyses by determining analysis-time dependencies connoting potential run-time interactions between relevant program quantities and scheduling the dataflow analysis of each program quantity after the dataflow analysis of all other program quantities upon which it depends. Because each phase may be analyzed separately, type partitioned dataflow analyses may enable the use of suitable efficient dataflow techniques, such as suitable sparse representation methods for example, that otherwise could not have been used for an entire non-separable program and may also enable the performance of dataflow analyses in parallel for more than one separate phase of such a non-separable program.

In accordance with the present invention, a method performs a dataflow analysis of a program. The dataflow analysis may be a points-to analysis or a constant propagation analysis, for example. The method may be implemented in the form of program modules or computer-executable instructions stored on a computer-readable medium. The method may produce a dataflow model and may be used with a compiler comprising an optimizer for optimizing the program based on the produced dataflow model.

For the method, quantities of the program are represented with types. A type relation comprising the types may be computed. The program quantities may be represented with types based on user-declared types of the program or using a type inference analysis performed in accordance with the dataflow analysis.

Dataflow analysis dependencies among the types representing program quantities are determined. Dataflow analysis dependencies may be determined for instances of polymorphic types, for types representing program quantities subject to type coercion in the program, or for types representing functions, for example.

A schedule of the program quantities is determined in accordance with the determined dataflow analysis dependencies. In determining the schedule, dataflow analysis dependencies among sets of one or more types representing program quantities may be determined. Mutually dependent program quantities may be represented by types in the same set of types. For dataflow analysis dependencies defined by a dependence relation, the dependence relation may be transformed by merging mutually dependent types in the dependence relation into type representatives such that the transformed dependence relation comprises type representatives each representing one or more types. A dependence relation represented by a dependence graph of nodes with each node representing one of the types may be transformed by collapsing each of one or more strongly-connected components of nodes representing mutually dependent types into a single node such that each node of the transformed dependence graph represents a type representative.

The sets of one or more types may be sorted in accordance with the determined dataflow analysis dependencies to determine the schedule. The sets of one or more types may be sorted in accordance with estimated dataflow analysis storage costs of program quantities represented by types of the sets. Sets of one or more types may also be merged in determining the schedule.

The dataflow analysis of the program quantities is performed in accordance with the determined schedule. Corresponding sets of one or more program quantities may be determined from the sets of one or more types in determining the schedule, and the dataflow analysis may be performed separately for each set of one or more program quantities. The dataflow analysis may be performed using a sparse representation technique for program quantities represented by types in the same set and may be performed in parallel for more than one set of one or more program quantities.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The subject matter of this patent application is disclosed in a conference paper, Ruf, E., "Partitioning Dataflow Analyses Using Types," *Proceedings of the* 1997 *ACM SIGPLAN/SIGACT Symposium on Principles of Programming Languages (POPL '97)*, Paris, France (Jan. 15–17, 1997). This paper is herein incorporated by reference.

Partitioning dataflow analyses into phases using types helps reduce costs attendant to the performance of suitable dataflow analyses of programs by suitable program analysis tools such as program understanding and browsing tools, compilers, interpreters, style checkers, static bug detectors, and program restructuring tools, for example. Using types to partition dataflow analyses also extends quantity-based partitioning to non-separable dataflow analyses where program quantities interact during the analysis and may therefore enable the use of suitable efficient dataflow techniques, such as suitable sparse representation methods for example, that otherwise could not have been used in analyzing entire non-separable programs. Using types to partition dataflow analyses may also enable the performance of dataflow analyses in parallel for more than one separate phase of such non-separable programs. Suitable dataflow analyses that may be partitioned using types include points-to analysis, constant propagation analysis, range propagation analysis, value range analysis, uninitialized-value analysis, slicing, or any other suitable value-based analysis, for example.

Exemplary Operating Environment

Figure 1:
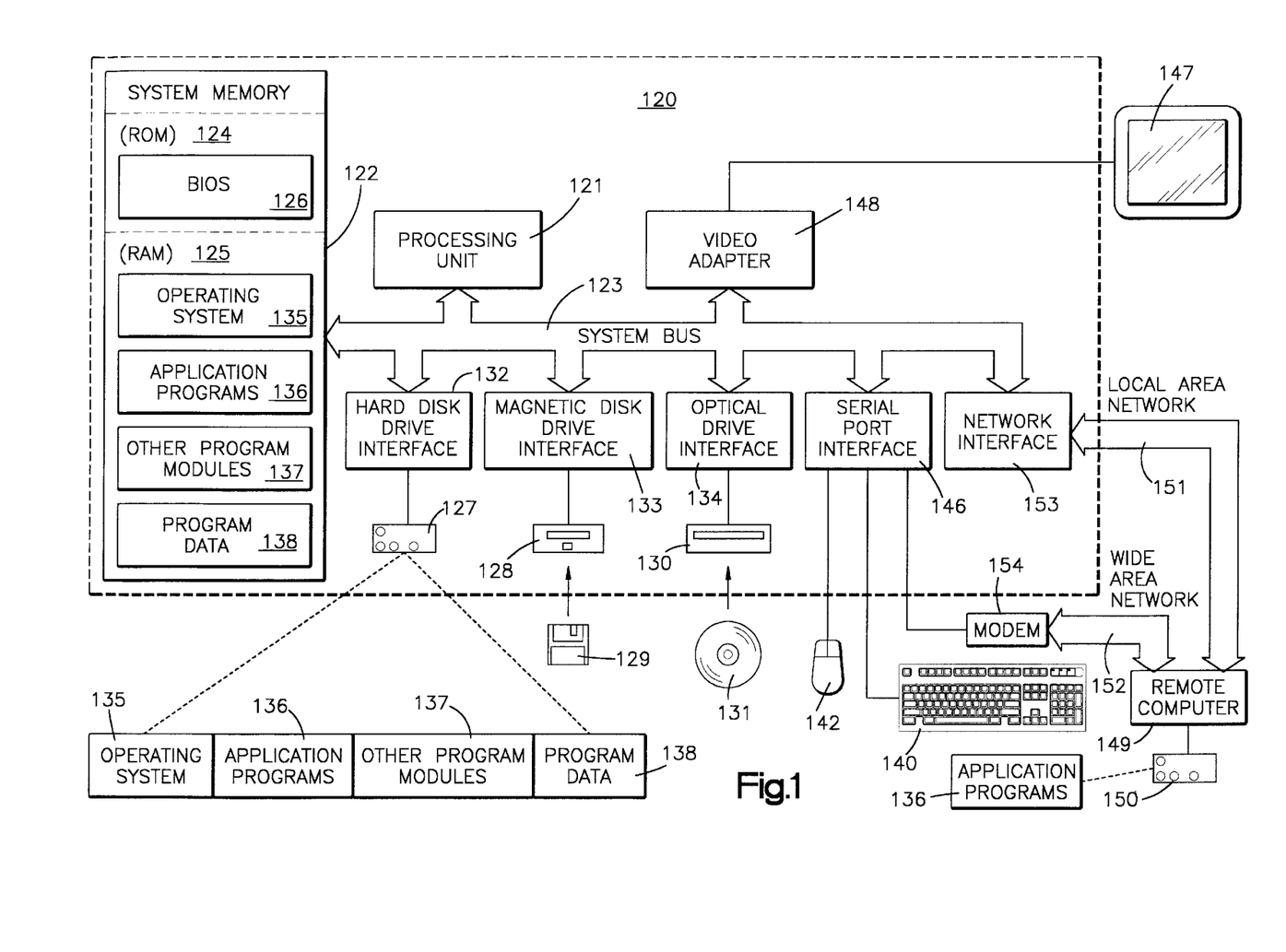
FIG. 1 illustrates an exemplary operating environment for performing type partitioned dataflow analyses.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable magnetic disk 129, and an optical disk drive 130 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as a video adapter 148. In addition to the monitor, personal computers typically include other peripheral output devices, such as speakers and printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, personal computer 120 is connected to local network 151 through a network interface or adapter 153. When used in a WAN networking environment, personal computer 120 typically includes a modem 154 or other means for establishing communications over wide area network 152, such as the Internet. Modem 154, which may be internal or external, is connected to system bus 123 via serial port interface 146. In a networked environment, program modules depicted relative to personal computer 120, or portions thereof, may be stored in remote memory storage device 150. It will be appreciated that the network connections shown are exemplary and other means of establishing a communications link between the computers may be used.

Exemplary Program Analysis Tool

Figure 2:
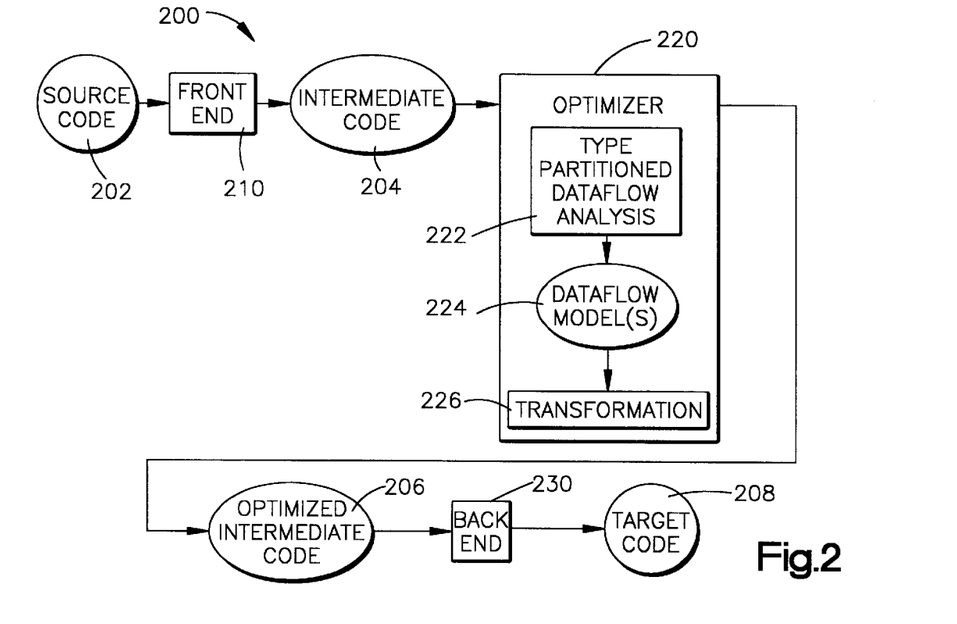
FIG. 2 illustrates an exemplary compiler that performs type partitioned dataflow analyses.

FIG. 2 illustrates a program compiler 200 as one exemplary program analysis tool that performs type partitioned dataflow analyses. Compiler 200 comprises a front end program module 210, an optimizer program module 220, and a back end program module 230. Compiler 200 compiles source code 202 in a suitable source language into target code 208 in a suitable target language. Target code 208 may be executed directly in a suitable operating environment or linked by a suitable linker with other target code for execution in a suitable operating environment.

Front end module 210 is source language dependent and performs suitable lexical, syntax, and semantic analyses, for example, on source code 202 to generate suitable intermediate code 204. Compiler 200 generates intermediate code 204 to represent source code 202 independent of the source language for source code 202 and independent of the specific machine or operating environment to execute target code 208.

Optimizer module 220 optimizes intermediate code 204 to generate optimized intermediate code 206. As illustrated in FIG. 2, optimizer module 220 comprises a type partitioned dataflow analysis program module 222 to perform one or more type partitioned dataflow analyses and generate one or more dataflow models 224 each in the form of a data structure to represent the approximate run-time behavior for intermediate code 204 in accordance with the performed dataflow analysis. Optimizer module 220 also comprises a transformation program module 226 for generating optimized intermediate code 206 in accordance with dataflow model(s)224. Optimizer module 220 may optimize intermediate code 204 in accordance with any suitable optimization techniques such as code motion, common subexpression elimination, dead code elimination, peephole optimization, and register allocation techniques, for example.

Back end module 230 is machine dependent and generates target code 208 based on optimized intermediate code 206.

For other embodiments, the performance of optimization techniques by optimizer module 220 may be supplemented with or replaced by optimization techniques performed by front end module 210 in generating intermediate code 204 and/or by back end module 230 in generating target code 208. Front end module 210 and/or back end module 230 may comprise type partitioned dataflow analysis module 222 to perform one or more type partitioned dataflow analyses on source code 202 and/or intermediate code 204, respectively.

Program modules 210, 220, 222, 226, and 230 for one embodiment are implemented as computer-executable instructions and may be stored on any suitable computer-readable medium for execution in a suitable operating environment. Source code 202, intermediate code 204, optimized intermediate code 206, target code 208, and dataflow model(s) 224 may also be stored on any suitable computer-readable medium.

Partitioned Dataflow Analyses Using Types

Type partitioned dataflow analyses perform a dataflow analysis of a program by partitioning the dataflow analysis into phases using types to help reduce costs attendant to the dataflow analysis of the entire program. Each phase models only a subset of the relevant program quantities and may be analyzed separately. Type partitioned dataflow analyses extend quantity-based partitioning to non-separable dataflow analyses by determining analysis-time dependencies connoting potential run-time interactions between relevant program quantities and scheduling the dataflow analysis of each program quantity after the dataflow analysis of all other program quantities upon which it depends. Because each phase may be analyzed separately, type partitioned dataflow analyses may enable the use of suitable efficient dataflow techniques, such as suitable sparse representation methods for example, that otherwise could not have been used for an entire non-separable program and may also enable the performance of dataflow analyses in parallel for more than one separate phase of such a non-separable program.

The partitioning is performed based on a dependence relation over types representing run-time and therefore analysis-time values for the relevant program quantities in a type relation between program quantities and types for the program. A type analysis computes the type relation from user-declared types in the program or with a non-standard type inference analysis in accordance with the dataflow analysis to be performed. A dependence analysis determines the dependence relation among types of the computed type relation, and therefore among the analysis-time values of relevant program quantities, in accordance with the dataflow analysis to be performed.

A partitioning algorithm transforms the dependence relation by merging mutually dependent types in the dependence relation into single type representatives so mutually dependent program quantities will be analyzed in the same phase and therefore simultaneously by the dataflow analysis. Each type representative of the transformed dependence relation represents one or more types and will correspond to a separate phase for the dataflow analysis.

The partitioning algorithm sorts the type representatives in the transformed dependence relation such that each program quantity represented by a type in the dependence relation will be scheduled for the dataflow analysis after the dataflow analysis of any and all program quantities upon which it depends. The partitioning algorithm then maps each type representative in the sorted dependence relation to a corresponding set of one or more program quantities to produce a schedule for the dataflow analysis. The dataflow analysis analyzes each program quantity set in accordance with the schedule to produce a dataflow model for the program.

Figure 3:
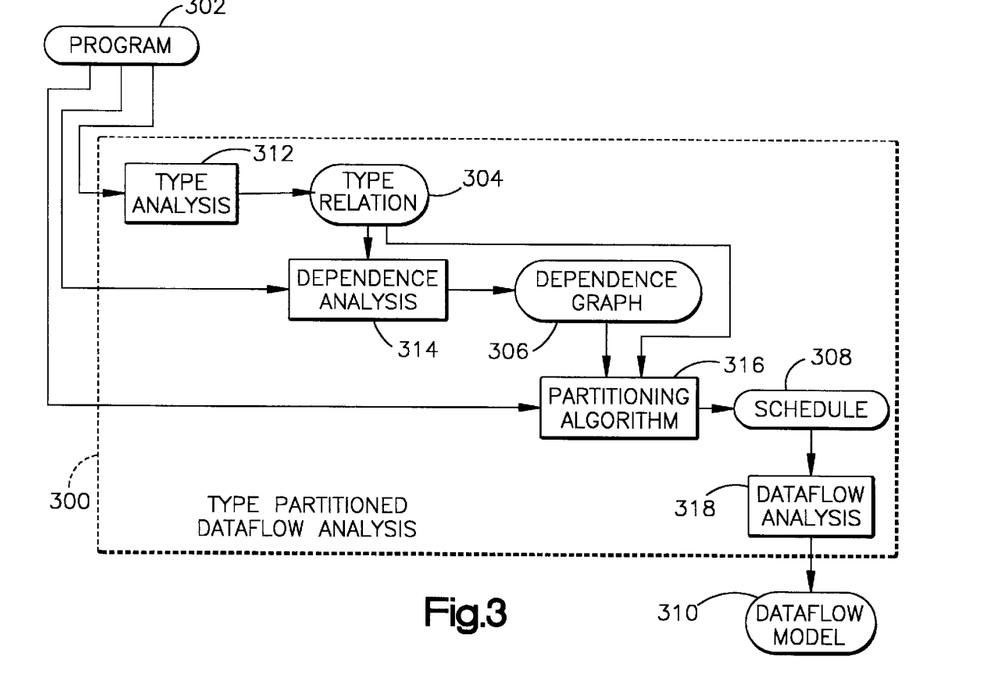
FIG. 3 illustrates, for one embodiment, a program module for performing type partitioned dataflow analyses.

FIG. 3 illustrates for one embodiment a program module 300 for performing type partitioned dataflow analyses for a program 302 to generate a dataflow model 310 representing the approximate run-time behavior for program 302 in accordance with the performed dataflow analysis. Program module 300 comprises a type analysis program module 312, a dependence analysis program module 314, a partitioning algorithm program module 316, and a dataflow analysis program module 318. Program module 300 for one embodiment performs type partitioned dataflow analyses in accordance with a flow diagram 400 illustrated in FIG. 4.

Figure 4:
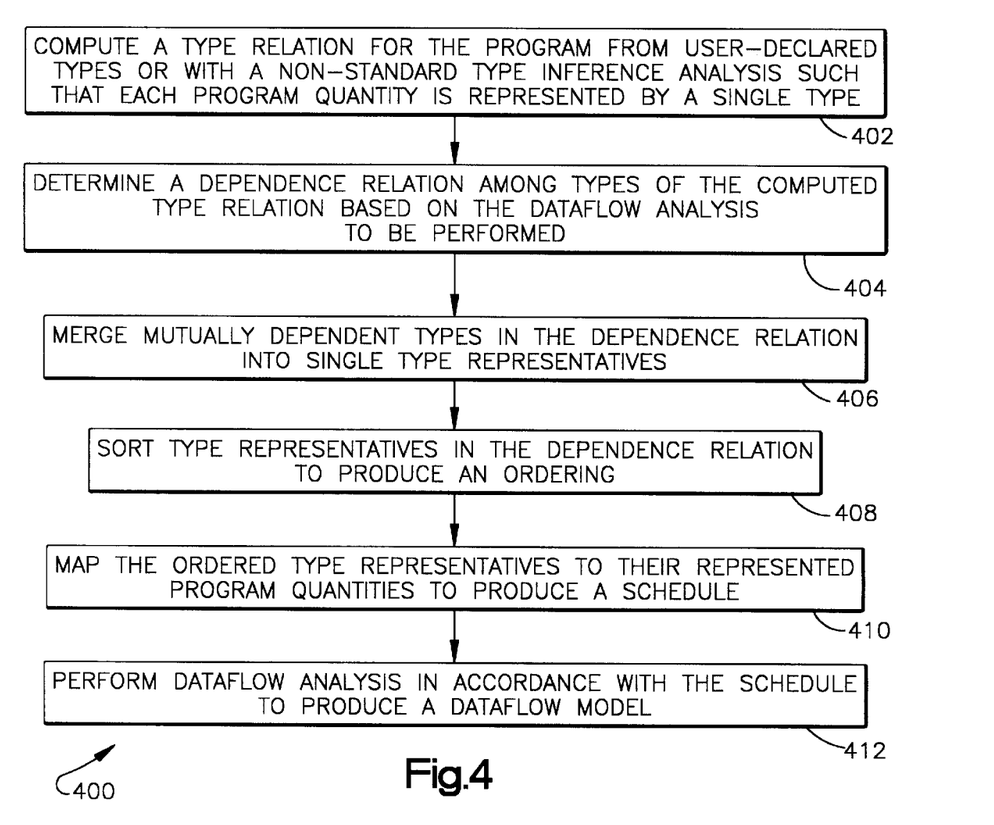
FIG. 4 illustrates, for one embodiment, a flow diagram for performing type partitioned dataflow analyses.

For step 402 of FIG. 4, type analysis module 312 computes a type relation 304 for program 302 such that the analysis-time value for each relevant program quantity of program 302 is represented by a single type in type relation 304. Program 302 may be defined in any suitable language or code including any suitable source code or any suitable intermediate code. As used in this detailed description, the term program refers to any suitable set of program code or instructions.

Type relation 304 for one embodiment defines a mapping from program quantities of program 302 to types and a corresponding inverse mapping from types to program quantities. Type analysis module 312 for one embodiment represents type relation 304 in the form of a type graph comprising nodes each representing a type or program quantity for type relation 304 and comprising arcs between nodes to represent mappings between program quantities and types.

Type analysis module 312 for one embodiment may establish type relation 304 from user-declared types in program 302 using a suitable compile-time type checking analysis for the language or code of program 302.

For another embodiment, type analysis module 312 may use a suitable non-standard type inference analysis in accordance with the dataflow analysis to be performed to compute type relation 304 for program 302. Non-standard type inference analyses conservatively approximate run-time and therefore analysis-time value flow in a program by establishing a type relation where all relevant program quantity values that may appear in a common context of the program, for example as the argument to an indirect pointer operation or as the value of a formal parameter, are represented by the same type. As compared to a type relation established from user-declared types, a type relation computed with non-standard type inference analyses may be finer-grained and therefore help increase the number of potential phases in which the dataflow analysis may be partitioned. A type relation computed by non-standard type inference analyses will more accurately type programs in type-unsafe languages such as the C programming language, for example, where data of a declared type may be accessed or manipulated as a different type.

Suitable non-standard type inference analyses for points-to analyses are described, for example, in Steensgaard, B., "Points-to Analysis in Almost Linear Time," *Proceedings of the 23rd ACM SIGPLAN/SIGACT Symposium on Principles of Programming Languages*, St. Petersburg, Fl., pp. 32–41 (Jan. 21–24, 1996), which is herein incorporated by reference; Steensgaard, B., "Points-to Analysis by Type Inference of Programs with Structures and Unions," *Lecture Notes on Computer Science*, Vol. 1060, *Proceedings of the 1996 International Conference on Compiler Construction*, Linköbing, Sweden, pp. 136–150 (Apr. 24–26, 1996), which is herein incorporated by reference; U.S. patent application Ser. No. 08/664,441, filed Jun. 18, 1996, entitled POINTER ANALYSIS BY TYPE INFERENCE COMBINED WITH A NON-POINTER ANALYSIS, by Bjarne Steensgaard, which is herein incorporated by reference; U.S. patent application Ser. No. 08/719,144, filed Sep. 24, 1996, entitled POINTER ANALYSIS BY TYPE INFERENCE FOR PROGRAMS WITH STRUCTURED MEMORY OBJECTS AND POTENTIALLY INCONSISTENT MEMORY OBJECT ACCESSES, by Bjarne Steensgaard, which is herein incorporated by reference; and U.S. patent application No. Ser. 08/882,746, filed Jun. 26, 1997, entitled TERMINATING POLYMORPHIC TYPE INFERENCE PROGRAM ANALYSIS, by Bjarne Steensgaard, which is herein incorporated by reference.

Suitable non-standard type inference analyses for constant propagation analyses are described, for example, in O'Callahan, R., et al., "Detecting Shared Representations Using Type Inference," Technical Report CMU-CS-95-202, School of Computer Science, Carnegie Mellon University, Pittsburgh, Pa. pp. 1–21 (September 1995), which is herein incorporated by reference, and O'Callahan, R., et al., "Practical Program Understanding with Type Inference," Technical Report CMU-CS-96-130, School of Computer Science, Carnegie Mellon University, Pittsburgh, Pa., pp. 1–18 (May 1996), which is herein incorporated by reference.

For step 404 of FIG. 4, dependence analysis module 314 determines a dependence relation among types of type relation 304, and therefore among the analysis-time values of the relevant program quantities, in accordance with the dataflow analysis to be performed.

Dependence analysis module 314 determines the dependence relation by determining pairs of related types of type relation 304. Dependence analysis module 314 determines two types are related if the analysis-time value of a relevant program quantity represented by one type may be affected by the analysis-time value of a relevant program quantity represented by the other type. Dependence analysis module 314 for one embodiment may determine the dependence relation such that the dependence relation does not include irrelevant types unnecessary for the performance of the dataflow analysis.

The determination of the dependence relation depends on the dataflow analysis to be performed. For points-to analyses, for example, two types are related if the dereferencing of an analysis-time quantity value represented by one type may access or modify an analysis-time quantity value represented by the other type. Other suitable relations for dataflow analyses include, for example, structural inclusion, coercion, and the compatibility relation described, for example, in O'Callahan, R., et al., "Practical Program Understanding with Type Inference," Technical Report CMU-CS-96-130, School of Computer Science, Carnegie Mellon University, Pittsburgh, Pa., pp. 1–18 (May 1996).

Dependence analysis module 314 for one embodiment may access program 302 as necessary to determine dependencies among program quantities and determine corresponding dependencies among types using the mapping of program quantities to types as defined by type relation 304. Because the type system generated by some non-standard type inference analyses will represent a flow-insensitive version of the dataflow analysis to be performed and therefore conservatively estimate the behavior of this dataflow analysis, dependence analysis module 314 for some embodiments may infer dependencies among types directly from the types themselves.

Dependence analysis module 314 for one embodiment represents the dependence relation in the form of a dependence graph 306. Dependence analysis module 314 represents each type in the dependence relation with a vertex or node in dependence graph 306 and represents the dependence between each pair of types with a directed edge from the node representing the dependent type to the node representing the type upon which the dependent type depends. Each node in dependence graph 306 may be labeled with the type represented by the node.

For steps 406, 408, and 410 of FIG. 4, partitioning algorithm module 316 determines a schedule 308 of the relevant program quantities of program 302 for the dataflow analysis to be performed based on the dependence relation. Partitioning algorithm module 316 for one embodiment represents schedule 308 in the form a data structure.

Partitioning algorithm module 316 for step 406 transforms the dependence relation by merging mutually dependent types in the dependence relation into a single type representative representing a set of the merged types because such types represent mutually dependent program quantities that are to be analyzed simultaneously by the dataflow analysis to be performed. The transformed dependence relation comprises type representatives each representing a set of one or more types of the dependence relation. Each type representative will correspond to a separate phase for the dataflow analysis.

Partitioning algorithm module 316 for one embodiment for step 406 collapses each strongly-connected component of dependence graph 306 into a single node representing a set of the types represented by the nodes belonging to the component. Partitioning algorithm module 316 labels each resulting node with the types of its component nodes and removes directed edges that both originate and terminate at the resulting node. Each node of the collapsed dependence graph represents a type representative, and the resulting dependence graph is a directed acyclic graph (DAG) corresponding to a partial ordering of type representatives.

Partitioning algorithm module 316 for step 408 sorts the type representatives of the resulting dependence relation to produce an ordering of type representatives. Partitioning algorithm module 316 sorts the type representatives in accordance with the dependencies among the type representatives such that each program quantity represented by a type representative in the dependence relation will be scheduled for the dataflow analysis after the dataflow analysis of any and all program quantities upon which it depends. Partitioning algorithm module 316 for one embodiment topologically sorts the collapsed dependence graph to produce a totally ordered graph.

As between type representatives whose ordering is not constrained by dependencies, partitioning algorithm module 316 may sort such equally-constrained type representatives in accordance with any suitable heuristic that may depend, for example, on the dataflow analysis to be performed. Partitioning algorithm module 316 may also sort two or more equally-constrained type representatives such that the program quantities represented by such type representatives are scheduled for dataflow analysis in parallel.

For one embodiment, partitioning algorithm module 316 may sort equally-constrained type representatives based on estimated analysis-time intermediate and/or final storage costs for analyzing the represented program quantities. Partitioning algorithm module 316 may estimate such costs using type relation 304 and/or program 302, for example, based on the number of program quantities represented by the type representative, the number of program points at which the represented program quantity or quantities are to be modeled during the dataflow analysis, and the number of program points at which a solution is required. Partitioning algorithm module 316 may order type representatives representing program quantities with higher intermediate storage requirements before type representatives representing program quantities with higher final storage requirements to help reduce peak storage requirements for the dataflow analysis.

Partitioning algorithm module 316 for one embodiment may merge suitable type representatives of the ordered dependence relation into a single type representative to help reduce execution time and/or memory space costs in performing the dataflow analysis. As one example, partitioning algorithm module 316 may merge two suitable type representatives corresponding to two phases of the dataflow analysis if costs in execution time and/or memory space incurred in performing the dataflow analysis for the single merged phase are potentially less than costs in execution time and/or memory space otherwise incurred in separately performing the dataflow analysis for each of the two phases.

Partitioning algorithm module 316 for step 410 maps the ordered type representatives to their represented program quantities to produce schedule 308 for the dataflow analysis. Partitioning algorithm module 316 for one embodiment traverses the ordered dependence graph and maps each node first to the represented type or types as determined by the node's label and then to the represented program quantity or quantities using the mapping of types to program quantities as defined by type relation 304. The resulting schedule 308 comprises a series of sets of one or more program quantities for analysis by dataflow analysis module 318.

For step 412 of FIG. 4, dataflow analysis module 318 analyzes each set of program quantities in accordance with schedule 308 to produce a dataflow model 310 for program 302. Dataflow analysis module 318 may perform any suitable dataflow analysis, such as a points-to analysis, a constant propagation analysis, a range propagation analysis, a value range analysis, an uninitialized-value analysis, slicing, or any other suitable value-based analysis, for example. In performing the dataflow analysis of each set of program quantities, dataflow analysis module 318 may use suitable efficient dataflow techniques, such as suitable sparse representation methods for example, that otherwise could not have been used for the entire program 302. Dataflow analysis module 318 may also perform the dataflow analysis for more than one program quantity in parallel in a multiprocessing or distributed operating environment, for example.

Program modules 300, 312, 314, 316, and 318 for one embodiment are implemented as computer-executable instructions and may be stored on any suitable computer-readable medium for execution in a suitable operating environment. Program 302, type relation 304, dependence graph 306, schedule 308, and dataflow model 310 may also be stored on any suitable computer-readable medium.

EXAMPLE

Figure 5A:
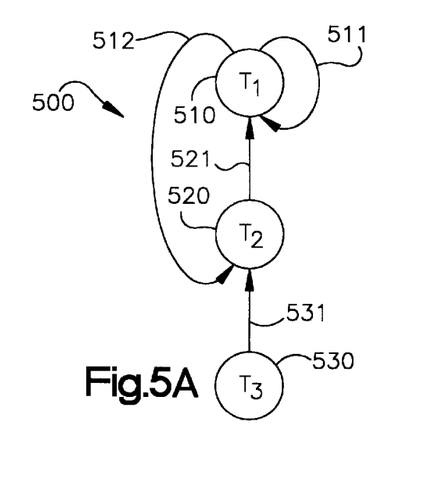
FIG. 5A illustrates a dependence graph generated from user-declared types in performing a type partitioned points-to analysis for an exemplary program.
Figure 5B:
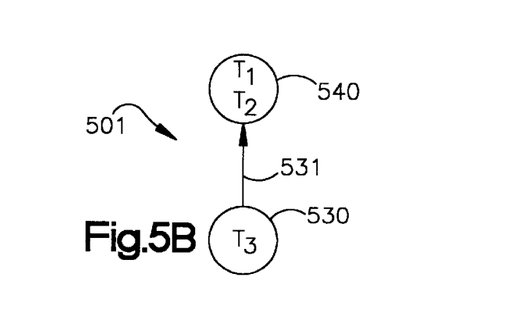
FIG. 5B illustrates a collapsed dependence graph generated from the type dependence graph of FIG. 5A in performing the type partitioned points-to analysis for the exemplary program.

FIGS. 5A and 5B illustrate type dependence graphs generated for one embodiment of a points-to analysis partitioned using user-declared types for the following program.

```
struct A { struct A *right; struct B *down; } a;
struct B { struct A *up; char *s1; char *s2; } b;
char *c, *d, *msg;
int test;
a.right = &a;
a.down = &b;
b.up = &a;
b.s1 = "foo";
b.s2 = "bar";
c = "baz";
msg = "message";
d = (test) ? c : a.right->down->s2;
puts(msg);
puts(c);
puts(d);
```

A points-to analysis of this program models the potential values of all pointer-valued storage and is therefore a non-separable analysis as the value of one pointer may depend on the values of other pointers.

The type relation computed for step 402 of FIG. 4 from the relevant user-declared types for this program comprises the following types and mappings between the types and quantities for this program.

| Name | Signature | Program Quantities |
|---|---|---|
| $T_1$ | struct A * | {&a, a.right, b.up} |
| $T_2$ | struct B * | {&b, a.down, a.right->down} |
| $T_3$ | char * | {b.s1, "foo", b.s2, "bar", c, "baz", msg, "message", a.right->down->s2, d, (test) ? c : a.right->down->s2} |

The computed type relation does not comprise the user-declared types struct A, struct B, char, or int as these types are unnecessary for performing a points-to analysis.

For step 404 of FIG. 4, the determined dependence relation for this program is represented by a dependence graph 500 illustrated in FIG. 5A. Dependence graph 500 comprises nodes 510, 520, and 530 representing the types $T_1$, $T_2$, and $T_3$, respectively. Dependence graph 500 also comprises directed edges 511, 512, 521, and 531 among nodes 510, 520, and 530 to represent the dependencies among the types $T_1$, $T_2$, and $T_3$.

The type $T_1$ depends upon itself because the dereferencing of a value of the type $T_1$ may access or modify another value of the type $T_1$ as indicated by the type declaration struct A {struct A *right; struct B *down;} a;. Dependence graph 500 therefore comprises directed edge 511 from node 510 back to itself. The type $T_1$ also depends upon the type $T_2$ because the dereferencing of a value of the type $T_2$ may access or modify a value of the type $T_1$ as indicated by the type declaration struct B {struct A *up; char *s1; char *s2;} b;. Dependence graph 500 therefore comprises directed edge 512 from node 510 to node 520.

The type $T_2$ depends upon the type $T_1$ because the dereferencing of a value of the type $T_1$ may access or modify a value of the type $T_2$ as indicated by the type declaration struct A {struct A *right; struct B *down;} a;. Dependence graph 500 therefore comprises directed edge 521 from node 520 to node 510.

The type $T_3$ depends upon the type $T_2$ because the dereferencing of a value of the type $T_2$ may access or modify a value of the type $T_3$ as indicated by the type declaration struct B {struct A *up; char *s1; char *s2;} b;. Dependence graph 500 therefore comprises directed edge 531 from node 530 to node 520.

Because the types $T_1$ and $T_2$ are mutually dependent upon one another, that is the type $T_1$ depends upon the type $T_2$ and the type $T_2$ depends upon the type $T_1$, the program quantities represented by the types $T_1$ and $T_2$ are to be simultaneously analyzed by the points-to analysis. For step 406 of FIG. 4, nodes 510 and 520, as nodes of a strongly-connected component, are therefore collapsed into a single node 540, and directed edges 511, 512, and 521 are removed to form a collapsed dependence graph 501 as illustrated in FIG. 5B. Collapsed dependence graph 501 comprises node 530 representing a type representative comprising the type $T_3$, node 540 representing a type representative comprising both types $T_1$ and $T_2$, and directed edge 531 representing that a type of the type representative $\{T_3\}$ depends upon a type of the type representative $\{T_1, T_2\}$.

For step 408 of FIG. 4, collapsed dependence graph 501 is topologically sorted in accordance with the dependency represented by directed edge 531 to produce the following ordering of type representatives:

$\{T_1, T_2\}, \{T_3\}$ as the program quantity or quantities represented by the type $T_3$ are to be scheduled for the points-to analysis after the points-to analysis of the program quantity or quantities represented by the type $T_2$.

The ordered type representatives are then mapped for step 410 of FIG. 4 to their represented program quantities to produce the following schedule of sets of one or more program quantities for the points-to analysis.

| | |
|---|---|
| $\{T_1, T_2\}$: | $\{\&a, a.right, b.up, \&b, a.down, a.right\text{->}down\}$ |
| $\{T_3\}$: | $\{b.s1, \text{"foo"}, b.s2, \text{"bar"}, c, \text{"baz"}, msg, \text{"message"}, a.right\text{->}down\text{->}s2, d,$ |
| | $(test)\ ?\ c : a.right\text{->}down\text{->}s2\}$ |

The points-to analysis for step 412 of FIG. 4 may analyze the program in accordance with this schedule of program quantity sets to produce a store model representing an approximate run-time behavior of store usage for the program. The points-to analysis may also use suitable sparse representation methods by using the schedule of program quantity sets to analyze only the relevant program quantities at the program points where they appear for each program quantity set. The points-to analysis, for example, may analyze the following two program fragments in accordance with the order of the schedule to produce a suitable store model.

Program Fragment 1 for $\{T_1, T_2\}$:
    a.right=&a;
    a.down=&b;
    b.up=&a;
    a.right->down;

Program Fragment 2 for $\{T_3\}$:
    b.s1="foo";
    b.s2="bar";
    c="baz";
    msg="message";
    d=(test)? c: a.right->down->s2;
    puts(msg);
    puts(c);
    puts(d);

The points-to analysis may reuse the computation of a.right->down from program fragment 1 for the computation of a.right->down->s2 for program fragment 2.

Figure 6A:
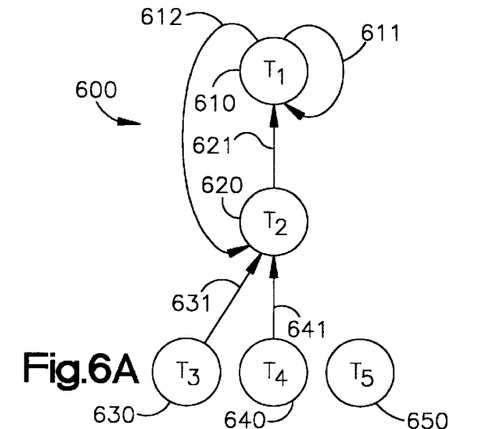
FIG. 6A illustrates a dependence graph generated with a suitable non-standard type inference analysis in performing a type partitioned points-to analysis for the exemplary program.
Figure 6B:
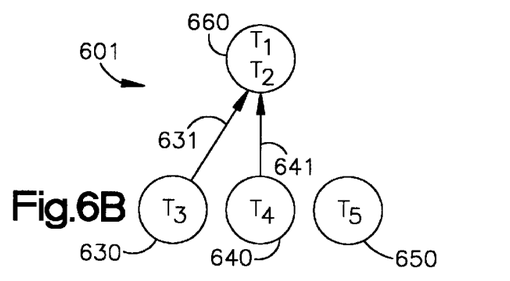
FIG. 6B illustrates a collapsed dependence graph generated from the type dependence graph of FIG. 6A in performing the type partitioned points-to analysis for the exemplary program.

FIGS. 6A and 6B illustrate type dependence graphs generated for one embodiment of a points-to analysis partitioned using a non-standard type inference analysis for the same program.

The type relation computed for step 402 of FIG. 4 using a non-standard type inference analysis, such as the type inference analysis described in Steensgaard, B., "Points-to Analysis by Type Inference of Programs with Structures and Unions," *Lecture Notes on Computer Science*, Vol. 1060, *Proceedings of the* 1996 *International Conference on Compiler Construction*, Linköbing, Sweden, pp. 136–150 (Apr. 24–26, 1996) for example, for the program comprises the following types and mappings between the types and program quantities.

three distinct types $T_3$, $T_4$, and $T_5$ having instances that carry character pointer values and therefore increases the number of potential phases in which the points-to analysis may be partitioned as compared to the use of user-declared types where the type relation comprises only one type representing character pointer values.

For step 404 of FIG. 4, the determined dependence relation for this program is represented by a dependence graph 600 illustrated in FIG. 6A. Dependence graph 600 comprises nodes 610, 620, 630, 640, and 650 representing the types $T_1$, $T_2$, $T_3$, $T_4$, and $T_5$, respectively. Dependence graph 600 also comprises directed edges 611, 612, 621, 631, 641 among nodes 610, 620, 630, and 640 to represent the dependencies among the types $T_1$, $T_2$, $T_3$, and $T_4$.

The type $T_1$ depends upon itself because the dereferencing of a value of the type $T_1$ may access or modify another value of the type $T_1$ as indicated by the $T_1$ * component of the signature $T_1$: $<T_1$ *, $T_2$ *>* (inferred from the program statement a.right=&a). Dependence graph 600 therefore comprises directed edge 611 from node 610 back to itself. The type $T_1$ also depends upon the type $T_2$ because the dereferencing of a value of the type $T_2$ may access or modify a value of the type $T_1$ as indicated by the $T_1$ * component of the signature $T_2$: $<T_1$ *, $T_3$ *, $T_4$ *>* (inferred from the program statement b.up=&a). Dependence graph 600 therefore comprises directed edge 612 from node 610 to node 620.

The type $T_2$ depends upon the type $T_1$ because the dereferencing of a value of the type $T_1$ may access or modify a value of the type $T_2$ as indicated by the $T_2$ * component of the signature $T_1$: $<T_1$ *, $T_2$ *>* (inferred from the program statement a.down=&b). Dependence graph 600 therefore comprises directed edge 621 from node 620 to node 610.

The type $T_3$ depends upon the type $T_2$ because the dereferencing of a value of the type $T_2$ may access or modify a value of the type $T_3$ as indicated by the $T_3$ * component of the signature $T_2$: $<T_1$ *, $T_3$ *, $T_4$ *>* (inferred from the program statement b.s1="foo"). Dependence graph 600 therefore comprises directed edge 631 from node 630 to node 620.

The type $T_4$ depends upon the type $T_2$ because the dereferencing of a value of the type $T_2$ may access or modify a value of the type $T_4$ as indicated by the $T_4$ * component

| Name | Signature | Program Quantities |
|---|---|---|
| $T_1$ | $<T_1$ *, $T_2$ *> * | $\{\&a, a.right, b.up\}$ |
| $T_2$ | $<T_1$ *, $T_3$ *, $T_4$ *> * | $\{\&b, a.down, a.right\text{->}down\}$ |
| $T_3$ | char * | $\{b.s1, \text{"foo"}\}$ |
| $T_4$ | char * | $\{b.s2, \text{"bar"}, c, \text{"baz"}, a.right\text{->}down\text{->}s2, d,$ |
| | | $(test)\ ?\ c : a.right\text{->}down\text{->}s2\}$ |
| $T_5$ | char * | $\{msg, \text{"message"}\}$ |

The computed type relation does not comprise types for structure variables a or b or for integer variable test as these types are unnecessary for performing a points-to analysis. Computing the type relation using non-standard types infers of the signature $T_2$: $<T_1$ *, $T_3$ *, $T_4$ *>* (inferred from the program statement b.s2="bar"). Dependence graph 600 therefore comprises directed edge 641 from node 640 to node 620.

The type $T_5$ does not depend from any of the types $T_1$, $T_2$, $T_3$, or $T_4$.

Because the types $T_1$ and $T_2$ are mutually dependent upon one another, the program quantities represented by the types $T_1$ and $T_2$ are to be simultaneously analyzed by the points-to analysis. For step 406 of FIG. 4, nodes 610 and 620, as nodes of a strongly-connected component, are therefore collapsed into a single node 660, and directed edges 611, 612, and 621 are removed to form a collapsed dependence graph 601 as illustrated in FIG. 6B. Collapsed dependence graph 601 comprises nodes 630, 640, and 650 each representing a respective type representative comprising the types $T_3$, $T_4$, and $T_5$, respectively, node 660 representing a type representative comprising both types $T_1$ and $T_2$, and directed edges 631 and 641 representing that a type of each respective type representative $\{T_3\}$ and $\{T_4\}$ depends upon a type of the type representative $\{T_1, T_2\}$.

For step 408 of FIG. 4, collapsed dependence graph 601 is topologically sorted in accordance with the dependencies represented by directed edges 631 and 641 to produce an ordering of type representatives. The type representatives $\{T_1, T_2\}$ and $\{T_5\}$ are both unconstrained, while the program quantities represented by the type representatives $\{T_3\}$ and $\{T_4\}$ are to be scheduled for the points-to analysis after the points-to analysis of the program quantities represented by the type representative $\{T_1, T_2\}$. The type representatives $\{T_1, T_2\}$ and $\{T_5\}$ are equally-constrained and may therefore be sorted based on estimated analysis-time intermediate and/or final storage costs for analyzing the represented program quantities. The heuristic for one embodiment schedules the type representative $\{T_1, T_2\}$ first as the type representative $\{T_1, T_2\}$ represents more program quantities and is therefore likely to require more final storage as compared to the type representative $\{T_5\}$. Once the type representative $\{T_1, T_2\}$ has been scheduled, the type representatives $\{T_3\}$, $\{T_4\}$, and $\{T_5\}$ become equally-constrained. The type representative $\{T_4\}$ represents more program quantities and therefore is likely to cost more in intermediate storage usage than either one of the type representatives $\{T_3\}$ or $\{T_5\}$. The type representative $\{T_5\}$ is likely to cost more than the type representative $\{T_3\}$ because msg appears twice in the program while b.s1 appears only once. The type representatives are therefore ordered as follows.

$\{T_1, T_2\}, \{T_4\}, \{T_5\}, \{T_3\}$

The ordered type representatives are then mapped for step 410 of FIG. 4 to their represented program quantities to produce the following schedule of sets of one or more program quantities for the points-to analysis.

| | |
|---|---|
| $\{T_1, T_2\}$: | {&a, a.right, b.up, &b, a.down, a.right->down} |
| $\{T_4\}$: | {b.s2, "bar", c, "baz", d, a.right->down->s2, d, (test) ? c : a.right->down->s2} |
| $\{T_5\}$: | {msg, "message"} |
| $\{T_3\}$: | {b.s1, "foo"} |

The points-to analysis for step 412 of FIG. 4 may analyze the program in accordance with this schedule of program quantity sets to produce a store model representing an approximate run-time behavior of store usage for the program. The points-to analysis may also use suitable sparse representation methods by using the schedule of program quantity sets to analyze only the relevant program quantities at the program points where they appear for each program quantity set. The points-to analysis, for example, may analyze the following four program fragments in accordance with the order of the schedule to produce a suitable store model.

| | |
|---|---|
| Program Fragment 1 for $\{T_1, T_2\}$: | a.right = &a;<br>a.down = &b;<br>b.up = &a;<br>a.right->down; |
| Program Fragment 2 for $\{T_4\}$: | b.s2 = "bar";<br>c = "baz";<br>d = (test) ? c : a.right->down->s2;<br>puts(c);<br>puts(d); |
| Program Fragment 3 for $\{T_5\}$: | msg = "message";<br>puts(msg); |
| Program Fragment 4 for $\{T_3\}$: | b.s1 = "foo"; |

The points-to analysis may reuse the computation of a.right->down from program fragment 1 for the computation of a.right->down->s2 for program fragment 2.

As with the performance of pointer analyses, computing type relations using non-standard types may similarly help increase the number of potential phases in which an integral constant propagation analysis, for example, may be partitioned. As one example, all program quantities of a user-declared integer type int will be scheduled in the same phase using a type relation computed from user-declared types whereas different program quantities of the same user-declared type int may be scheduled in different phases using a type relation computed with a non-standard type inference analysis.

Complications

Type partitioned dataflow analyses may have to account for various complications, such as polymorphism, coercion, and first-class functions for example, encountered for some programming languages.

Runtime polymorphism in the form of disjoint union types, subtypes, or "pointer to any" types, for example, can induce false dependencies in the dependence relation and force the analysis of all instances for a polymorphic type into the same phase.

For type partitioned dataflow analyses of type-safe languages without coercions, including runtime-typed languages, analysis-time polymorphism may be preserved by generating the dependence relation without polymorphic types and then adding a polymorphic type to each type representative of the dependence relation that may contain a potential instance of that polymorphic type. Program quantities of a polymorphic type may therefore be scheduled for analysis in more than one phase, noting that, without coercion, the instance types cannot interfere. Thus, no interactions between program quantities will be missed and minimal or no additional space will be consumed as each phase will model a disjoint set of runtime values. Types such as Modula-3's ref any type may be modeled in this manner without undue conservatism. When analyzing unsafe types, such as the void * type of the C programming language for example, the dependence relation generated with the polymorphic types may be used or the program being analyzed must indicate polymorphism is not being used to subvert the type system.

Type partitioned dataflow analyses may also address polymorphism by using a monomorphic type inference analysis to compute the type relation with a distinct monomorphic type for each program quantity of a polymorphic type. In this manner, some false dependencies may be avoided although the dataflow analysis may be overly conservative. By using a polymorphic type inference analysis to compute the type relation, program quantities of a polymorphic type may be scheduled for analysis in more than one phase. Indeed, a polymorphic type inference analysis may infer polymorphic types in monomorphic programs as described, for example, in O'Callahan, R., et al., "Detecting Shared Representations Using Type Inference," Technical Report CMU-CS-95-202, School of Computer Science, Carnegie Mellon University, Pittsburgh, Pa., pp. 1–21 (September 1995), and allow for additional levels of partitioning.

For type partitioned dataflow analyses of languages supporting coercion such as the C programming language where type casting allows a programmer to force quantities of one type, including monomorphic quantities, to carry values associated with some other type, the coercion should be reflected in the dependence relation. The analysis may otherwise generate an underconstrained schedule and compute inaccurate results.

Type partitioned dataflow analyses for one embodiment may traverse the program to compute a coerced-to relation on types and add all elements of the coerced-to relation to the dependence relation. Where the coerced-to relation contains circularities, the analysis may generate the dependence relation with relatively more strongly-connected components of nodes and therefore generate a relatively shorter schedule of type representatives having relatively larger set of types. For older programs in the C programming language where the char * type is used simultaneously as a memory allocator type, a polymorphic structure pointer type, and a string type, the analysis will group relatively more pointer types in the same type representative as the char * type.

Type partitioned dataflow analyses may also address coercion by using a non-standard type inference analysis that accounts for type casts in assigning types for the type relation. The type inference analysis may infer the same type for expressions related by a type cast and unify types for individual cast expressions, each of which has its own inferred input/output types, rather than unifying types at a whole program level where, for example, the analysis would be forced to unify the types char and int. Analyzing type casts in this manner helps reduce false dependencies in the dependence relation.

For interprocedural dataflow analyses involving first-class functions, such as a points-to analysis involving function pointers in the C programming language for example, the dataflow solution for a function value determines, and is determined by, control flow edges between procedures. As arbitrary non-function program quantities may be affected, type partitioned dataflow analyses for one embodiment account for such control dependencies.

For a type relation computed from user-declared types, control dependencies are not embedded in the types. Type partitioned dataflow analyses for one embodiment may traverse the program code and establish dependencies between function types and the formal, actual, return, result, and modified/referenced global types at all indirect function calls. For another embodiment, the function solution may be precomputed.

Type partitioned dataflow analyses may also address first-class functions by using a non-standard type inference analysis that infers function types for every function and at every application. The analysis may use these types to compute a conservative approximation to the function values reaching each application and then remove the function values from the dataflow analysis. In this manner, relatively more potential dependencies may be eliminated at some cost in precision.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A computer readable medium having computer-executable instructions for performing a dataflow analysis of a program, comprising the steps of:
   (a) representing quantities of the program with types;
   (b) partitioning the dataflow analysis of the program into phases based on the types; and
   (c) separately performing the dataflow analysis for each phase.

2. The computer readable medium of claim 1, wherein the representing step (a) comprises the step of representing program quantities with types based on user-declared types of the program.

3. The computer readable medium of claim 1, wherein the representing step (a) comprises the step of representing program quantities with types using a type inference analysis performed in accordance with the dataflow analysis.

4. A method for performing a dataflow analysis of a program, the method comprising the steps of:
   (a) representing quantities of the program with types;
   (b) partitioning the dataflow analysis of the program into phases based on the types; and
   (c) separately performing the dataflow analysis for each phase, wherein the partitioning step (b) comprises the steps of:
       (i) determining dataflow analysis dependencies among sets of one or more types representing program quantities, wherein each set of one or more types corresponds to one of the phases, and
       (ii) sorting the sets of one or more types in accordance with the determined dataflow analysis dependencies to establish an ordering for the dataflow analysis of each phase.

5. The method of claim 4, wherein the performing step (c) comprises the step of performing the dataflow analysis for more than one phase in parallel.

6. The method of claim 4, wherein the performing step (c) comprises the step of performing the dataflow analysis using a sparse representation technique for one or more of the phases.

7. The method of claim 4, comprising the step of:
   generating optimized code for the program in accordance with the performed dataflow analysis.

8. The method of claim 4, wherein the dataflow analysis is a points-to analysis or a constant propagation analysis.

9. A method for performing a dataflow analysis of a program, the method comprising the steps of:
   (a) representing quantities of the program with types;
   (b) determining dataflow analysis dependencies among the types representing program quantities and representing at least some mutually dependent program types as a type representative including multiple types;
   (c) determining a schedule of the program quantities based on the type representative determined for each program quantity; and
   (d) performing the dataflow analysis of the program quantities in accordance with the determined schedule.

10. The method of claim 9, wherein the representing step (a) comprises the step of representing program quantities with types based on user-declared types of the program.

11. The method of claim 9, wherein the representing step (a) comprises the step of representing program quantities with types using a type inference analysis performed in accordance with the dataflow analysis.

12. A method for performing a dataflow analysis of a program, the method comprising the steps of:
   (a) representing quantities of the program with types;
   (b) determining dataflow analysis dependencies among the types representing program quantities;
   (c) determining a schedule of the program quantities in accordance with the determined dataflow analysis dependencies; and
   (d) performing the dataflow analysis of the program quantities in accordance with the determined schedule, wherein the determining step (c) comprises the steps of:
      (i) determining dataflow analysis dependencies among sets of one or more types representing program quantities, and
      (ii) sorting the sets of one or more types in accordance with the dataflow analysis dependencies determined for the determining step (c)(i) to determine the schedule.

13. The method of claim 12, wherein the determining step (c)(i) comprises the step of representing mutually dependent program quantities by types in the same set of types.

14. The method of claim 13, wherein the determining step (b) comprises the step of determining a dependence graph of nodes each representing one of the types; and
   wherein the determining step (c)(i) comprises the step of collapsing one or more strongly-connected components of nodes of the dependence graph.

15. The method of claim 12, wherein the sorting step (c)(ii) comprises the step of sorting sets of one or more types in accordance with estimated dataflow analysis storage costs of program quantities represented by types of the sets.

16. The method of claim 12, wherein the determining step (c) comprises the step of merging sets of one or more types.

17. The method of claim 12, wherein the determining step (c) comprises the step of determining corresponding sets of one or more program quantities from the sets of one or more types; and
   wherein the performing step (d) comprises the step of separately performing the dataflow analysis for each set of one or more program quantities.

18. The method of claim 12, wherein the performing step (d) comprises the step of performing in parallel the dataflow analysis for more than one set of one or more program quantities, wherein each set of one or more program quantities corresponds to one of the sets of one or more types.

19. The method of claim 12, wherein the performing step (d) comprises the step of performing the dataflow analysis using a sparse representation technique for program quantities represented by types in the same set.

20. The method of claim 12, wherein the determining step (b) comprises the step of determining dataflow analysis dependencies for instances of polymorphic types.

21. The method of claim 12, wherein the determining step (b) comprises the step of determining dataflow analysis dependencies for types representing program quantities subject to type coercion in the program.

22. The method of claim 12, wherein the determining step (b) comprises the step of determining dataflow analysis dependencies for types representing functions.

23. The method of claim 12, comprising the step of:
   generating optimized code for the program in accordance with the performed dataflow analysis.

24. The method of claim 12, wherein the dataflow analysis is a points-to analysis or a constant propagation analysis.

25. A computer-readable medium having computer-executable instructions for performing a dataflow analysis of a program, comprising the steps of:
   (a) representing quantities of the program with types;
   (b) determining dataflow analysis dependencies among the types representing program quantities;
   (c) determining a schedule of the program quantities in accordance with the determined dataflow analysis dependencies; and
   (d) performing the dataflow analysis of the program quantities in accordance with the determined schedule.

26. A method for performing a dataflow analysis of a program, the method comprising the steps of:
   (a) computing a type relation comprising types representing quantities of the program;
   (b) determining a dependence relation defining dependencies among types of the type relation in accordance with the dataflow analysis;
   (c) transforming the dependence relation by merging mutually dependent types in the dependence relation into type representatives such that the transformed dependence relation comprises type representatives each representing one or more types of the type relation;
   (d) sorting the type representatives of the transformed dependence relation in accordance with the dependencies defined by the transformed dependence relation;
   (e) determining a set of one or more program quantities represented by the types of each of the sorted type representatives to determine a schedule; and
   (f) performing the dataflow analysis for each set of one or more program quantities in accordance with the determined schedule.

27. The method of claim 26, wherein the computing step (a) comprises the step of computing the type relation from user-declared types of the program.

28. The method of claim 26, wherein the computing step (a) comprises the step of computing the type relation using a type inference analysis performed in accordance with the dataflow analysis.

29. The method of claim 26, wherein the determining step (b) comprises the step of determining a dependence graph of nodes each representing one of the types of the type relation; and
   wherein the transforming step (c) comprises the step of collapsing one or more strongly-connected components of nodes of the dependence graph.

30. The method of claim 26, wherein the sorting step (d) comprises the step of sorting type representatives in accordance with estimated dataflow analysis storage costs of program quantities represented by types of the type representatives.

31. The method of claim 26, comprising the step of merging type representatives of the transformed dependence relation.

32. The method of claim 26, wherein the performing step (f) comprises the step of performing in parallel the dataflow analysis for more than one of the sets of program quantities.

33. The method of claim 26, wherein the performing step (f) comprises the step of performing the dataflow analysis using a sparse representation technique for program quantities in the same set of program quantities.

34. The method of claim 26, wherein the determining step (b) comprises the step of determining dependencies for instances of polymorphic types.

35. The method of claim 26, wherein the determining step (b) comprises the step of determining dependencies for types representing program quantities subject to type coercion in the program.

36. The method of claim 26, wherein the determining step (b) comprises the step of determining dependencies for types representing functions.

37. The method of claim 26, comprising the step of:

(g) generating optimized code for the program in accordance with the performed dataflow analysis.

38. The method of claim 26, wherein the dataflow analysis is a points-to analysis or a constant propagation analysis.

39. A computer-readable medium having computer-executable instructions for performing the steps of claim 26.

40. A type partitioned dataflow analysis system for performing a dataflow analysis of a program, the system comprising:

(a) a type analysis program module for computing a type relation comprising types representing quantities of the program;

(b) a dependence analysis program module for generating a dependence graph representing dependencies among types of the type relation in accordance with the dataflow analysis, the dependence graph comprising nodes each representing one of the types of the type relation;

(c) a partitioning algorithm program module for:
   (i) transforming the dependence graph by collapsing each of one or more strongly-connected components of nodes representing mutually dependent types into a single node such that each node of the transformed dependence graph represents a type representative of one or more types of the type relation,
   (ii) sorting the type representatives of the transformed dependence graph in accordance with the dependencies defined by the transformed dependence graph to establish an ordering of the type representatives, and
   (iii) mapping each type representative to a respective set of one or more program quantities represented by the types of the type representative; and (d) a dataflow analysis program module for performing the dataflow analysis for each set of one or more program quantities in accordance with the established ordering to produce a dataflow model.

41. The system of claim 40, wherein the type analysis program module computes the type relation from user-declared types of the program.

42. The system of claim 40, wherein the type analysis program module performs a type inference analysis in accordance with the dataflow analysis to compute the type relation.

43. The system of claim 40, wherein the dataflow analysis program module performs in parallel the dataflow analysis for more than one of the sets of program quantities.

44. The system of claim 40, wherein the dataflow analysis program module performs the dataflow analysis using a sparse representation technique for program quantities in the same set of program quantities.

45. The system of claim 40, comprising a compiler for compiling the program from a first language into code in a second language, the compiler comprising an optimizer for optimizing the code based on the produced dataflow model.

46. The system of claim 40, wherein the dataflow analysis is a points-to analysis or a constant propagation analysis.

* * * * *